(12) United States Patent
Modi et al.

(10) Patent No.: US 11,493,350 B2
(45) Date of Patent: Nov. 8, 2022

(54) METHOD AND APPARATUS FOR PROVIDING ALERT NOTIFICATIONS OF HIGH-RISK DRIVING AREAS IN A CONNECTED VEHICLE

(71) Applicant: GM GLOBAL TECHNOLOGY OPERATIONS LLC, Detroit, MI (US)

(72) Inventors: Ashish K. Modi, Troy, MI (US); Bhargavi Sarma, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 490 days.

(21) Appl. No.: 16/551,099

(22) Filed: Aug. 26, 2019

(65) Prior Publication Data

US 2021/0063178 A1    Mar. 4, 2021

(51) Int. Cl.
*G01C 21/34* (2006.01)
*G01C 21/36* (2006.01)
*G01S 19/13* (2010.01)

(52) U.S. Cl.
CPC ..... *G01C 21/3461* (2013.01); *G01C 21/3667* (2013.01); *G01S 19/13* (2013.01)

(58) Field of Classification Search
CPC ............ G01C 21/3461; G01C 21/3415; G01C 21/3667; B60W 2050/146; B60W 2050/143; B60W 2050/0002; B60W 60/00; B60W 50/00; B60W 50/14; B60W 2050/046; B60W 50/08; G01S 19/13
See application file for complete search history.

(56) References Cited

U.S. PATENT DOCUMENTS

| | | | | |
|---|---|---|---|---|
| 10,579,070 | B1* | 3/2020 | Konrardy | G08B 25/014 |
| 10,706,605 | B1* | 7/2020 | Russo | G06T 13/00 |
| 2016/0305787 | A1* | 10/2016 | Sato | G01C 21/34 |
| 2018/0201263 | A1* | 7/2018 | Slusar | G01C 21/00 |
| 2019/0049257 | A1* | 2/2019 | Westover | G01C 21/28 |
| 2019/0146495 | A1* | 5/2019 | Yan | B60W 40/08 |
| | | | | 701/26 |
| 2020/0047771 | A1* | 2/2020 | Yoon | B60W 50/08 |
| 2020/0111169 | A1* | 4/2020 | Halder | G01C 21/3697 |

* cited by examiner

*Primary Examiner* — Behrang Badii
(74) *Attorney, Agent, or Firm* — Lorenz & Kopf, LLP

(57) ABSTRACT

The present application relates to providing alert notifications of high-risk driving areas in a connected vehicle by calculating a first navigational route between a host vehicle location and a destination, transmitting the first navigational route via a wireless network, receiving via a wireless network an indication of a high-risk area in response to the first navigational route, generating a second navigational route in response to the high-risk area, presenting the second navigational route to a vehicle occupant via a user interface and prompting user action.

19 Claims, 5 Drawing Sheets

METHOD AND APPARATUS FOR PROVIDING ALERT NOTIFICATIONS OF HIGH-RISK DRIVING AREAS IN A CONNECTED VEHICLE

BACKGROUND

The present disclosure relates generally to programming motor vehicle control systems. More specifically, aspects of this disclosure relate to systems, methods and devices for predicting high-risk driving areas in response to historical and current data and generating a rerouting operation, driving warning or driver take over request in response to the prediction.

The operation of modern vehicles is becoming more automated, i.e. able to provide driving control with less and less driver intervention. Vehicle automation has been categorized into numerical levels ranging from zero, corresponding to no automation with full human control, to five, corresponding to full automation with no human control. Various advanced driver-assistance systems (ADAS), such as cruise control, adaptive cruise control, and parking assistance systems correspond to lower automation levels, while true "driverless" vehicles correspond to higher automation levels.

Certain levels of ADAS systems, such as level one and level two, may require a driver to take over operation of a vehicle under certain conditions. Take over requests may be generated in response to events such as entering a construction site, merging or exiting a freeway, loss of road markings, or presence of extreme weather conditions. In addition, as conditions change, such as weather or lane configuration, an area that had previously been a low risk area may become a high-risk area. It would be desirable to avoid high risk areas during vehicle navigation when lower risk areas are available in order to avoid vehicle incident and/or ADAS takeover requests. It would be desirable to address these problems to provide a method and apparatus for predicting a region of high-risk driving conditions to enable the systems to warn the driver, or automated driving system, in advance.

The above information disclosed in this background section is only for enhancement of understanding of the background of the invention and therefore it may contain information that does not form the prior art that is already known in this country to a person of ordinary skill in the art.

SUMMARY

Disclosed herein are autonomous vehicle control system training systems and related control logic for provisioning autonomous vehicle control, methods for making and methods for operating such systems, and motor vehicles equipped with onboard control systems. By way of example, and not limitation, there is presented an automobile with onboard vehicle control learning and control systems.

In accordance with an aspect of the present invention, an apparatus including a receiver operative to receive data indicative of a high-risk area, a processor operative generate a first navigational route, to compare the first navigational route to the data indicative of the high-risk area, and to generate a second navigational route in response to the first navigational route including the high-risk area, and a user interface to display the second navigational route to a vehicle driver.

In accordance with another aspect of the present invention wherein the data indicative of the high-risk area includes data indicative of vehicle to vehicle incidents.

In accordance with another aspect of the present invention wherein the data indicative of the high-risk area includes data indicative of an advanced driving assistance system disengagement event.

In accordance with another aspect of the present invention, a transmitter for transmitting the first navigational route via a wireless network and wherein the data indicative of the high-risk area is received in response to the first navigational route.

In accordance with another aspect of the present invention, a memory for storing a map data and wherein the first navigational route and the second navigational route are generated in response to the map data.

In accordance with another aspect of the present invention wherein the user interface is operative to present an indicator of the high-risk area and an option to the vehicle driver to select the second navigational route or the first navigational route.

In accordance with another aspect of the present invention wherein the processor is further operative to predict an advanced driving assistance system disengagement event in response to the data indicative of the high-risk area, to generate a user alert in response to the prediction and to couple the user alert to the user interface, the user interface being further operative to display the user alert.

In accordance with another aspect of the present invention, a method performed by a processor operative for calculating a first navigational route between a host vehicle location and a destination, transmitting the first navigational route via a wireless network, receiving via a wireless network an indication of a high-risk area in response to the first navigational route, generating a second navigational route in response to the high-risk area, presenting the second navigational route to a vehicle occupant via a user interface.

In accordance with another aspect of the present invention further operative to control the host vehicle along the second navigational route.

In accordance with another aspect of the present invention wherein the indication of the high-risk area includes data indicative of a vehicle to vehicle incident.

In accordance with another aspect of the present invention wherein the indication of the high-risk area includes data indicative of an advanced driving assistance system disengagement event.

In accordance with another aspect of the present invention including predicting an advanced driving assistance system disengagement event in response to the indication of the high-risk area and generating a driver warning in response to the prediction.

In accordance with another aspect of the present invention wherein the indication of the high-risk area is generated in response to pedestrian behavior within the high-risk area.

In accordance with another aspect of the present invention wherein the indication of the high-risk area is generated in response to a current event within the high-risk area.

In accordance with another aspect of the present invention wherein the indication of the high-risk area is a geographical region determined by a remote service provider in response to crowdsourced data.

In accordance with another aspect of the present invention wherein the indication of the high-risk area is a geographical region determined by a remote service provider in response to publicly available highway safety data.

In accordance with another aspect of the present invention wherein the second navigational route is generated in response to the high-risk area and a driver behavioral determination.

In accordance with another aspect of the present invention an advanced driver assistance system for controlling a host vehicle including a global positioning system sensor for detecting the host vehicle location, a user interface for receiving a user input indicative of a destination and to display a navigational route and an alternative route, a memory operative to store a map data, a transmitter for transmitting the navigational route via a wireless network, a receiver for receiving a high-risk driving location in response to the navigational route, a processor for generating the navigational route in response to the host vehicle location, the destination, and the map data, the processor further operative to generate the alternative route in response to the high-risk driving location being located along the navigational route and to couple the alternative route to the user interface.

In accordance with another aspect of the present invention further including a vehicle controller for controlling the vehicle along the alternative route in response to a control signal from the processor and a user selection of the alternative route via the user interface.

In accordance with another aspect of the present invention wherein the processor is further operative to predict an advanced driving assistance system disengagement event in response to the high-risk driving location and for generating a user warning in response to the prediction of the advanced driving assistance system disengagement event and for coupling the user warning to the user interface.

The above advantage and other advantages and features of the present disclosure will be apparent from the following detailed description of the preferred embodiments when taken in connection with the accompanying drawings.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings.

The exemplifications set out herein illustrate preferred embodiments of the invention, and such exemplifications are not to be construed as limiting the scope of the invention in any manner.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but are merely representative. The various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
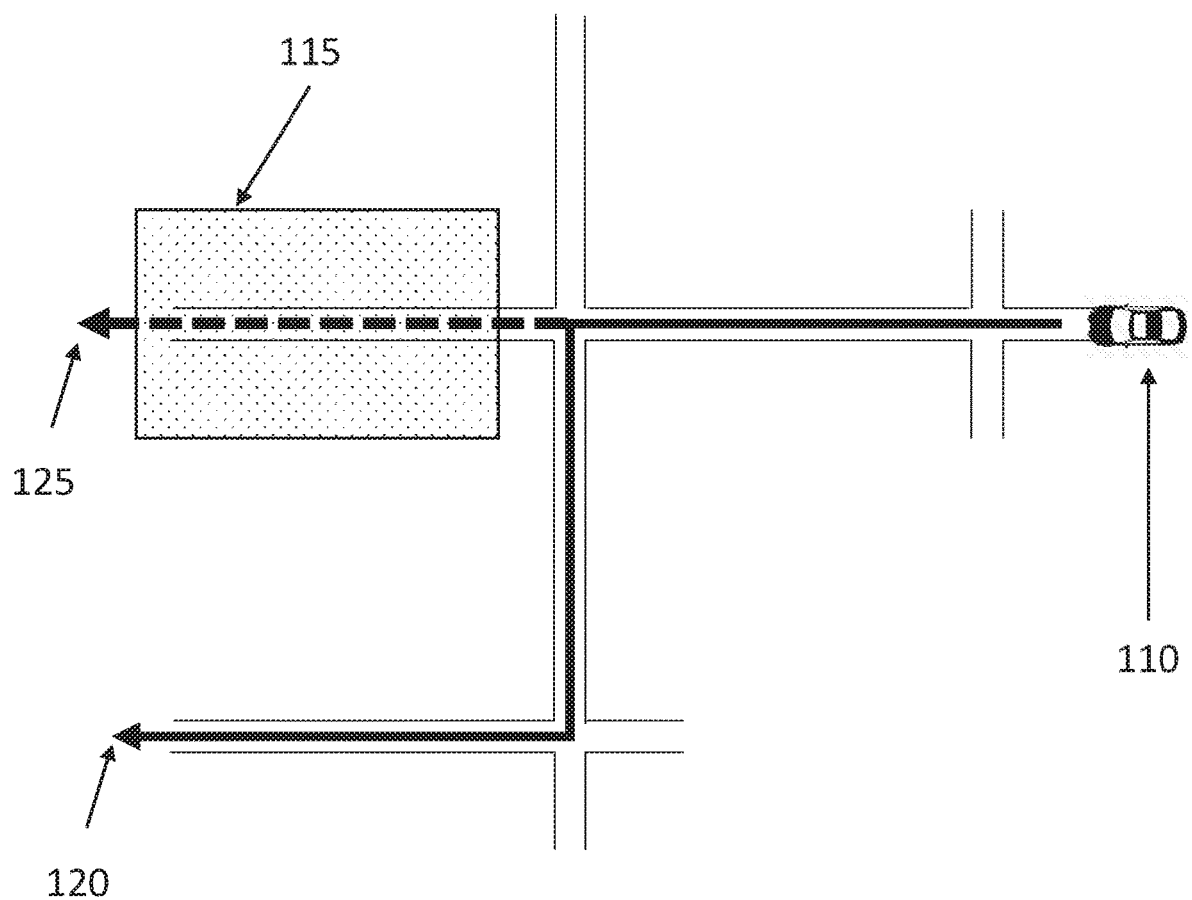
FIG. 1 shows an operating environment for providing alert notifications of high-risk driving areas in a connected vehicle according to an exemplary embodiment.

FIG. 1 schematically illustrates an operating environment 100 for providing alert notifications of high-risk driving areas in a connected vehicle 110. In this exemplary embodiment of the present disclosure, the vehicle 110 is driving is travelling on a route determined in response to an original location of the vehicle 110 and a destination input by a driver. Processing systems onboard the vehicle 110 are then operative to use map data stored in a memory in the vehicle 110 to generate a first navigational route 125. The processing systems onboard the vehicle 110 may then be operative to receive additional data via a wireless network indicative of environmental factors along the first navigational route 125 such as National Highway and Traffic Safety administration (NHTSA) data, emergency event history, local area driving behavior data. This additional data may be combined with current time of data, current weather data, local pedestrian behavior, public transport schedules, etc., in order to detect a high-risk area 115 on the navigational route 125. A high-risk area 115 may be an area with increased likelihood of a traffic event, such as vehicle to vehicle contact, or an area where a disengagement event may occur for an ADAS equipped vehicle 110 requiring driver intervention or resumption of control of the vehicle 110 by a driver. The exemplary system may then be operative to generate a second navigational route 120 to avoid the high-risk area 115.

The exemplary system and methods for operation in the environment 100 may be operative to combine NHTSA and manufacturer Advanced Automatic Collision Notification (AACN) data to determine high-risk areas 115 along with current weather, time of day (position of Sun based on driving direction, visibility) and other conditions such as flood zones and road conditions which may increase the likelihood of a traffic event and alert ADAS equipped vehicle operators to take appropriate actions. Data may include vehicle crash data from connected vehicles available in a manufacturer back office. The exemplary systems are operative to provide smart notifications to the ADAS equipped vehicle operators prompting them to take control of the steering wheel and other vehicle control systems in a high-risk area where driving conditions may not be safe even though the route itself may be ADAS enabled. The exemplary system may be operative to generate re-route directions based on safety threats identified for autonomous Vehicles merge data from various sources and build a machine learning model to determine high-risk driving areas. Re-route directions may be based on safety threats identified for autonomous vehicles. The exemplary system may provide notifications to ADAS equipped vehicle drivers to take control as the vehicle 110 approaches the high-risk area 125.

In order to determine the high-risk area 115, an exemplary system and method may use location, timestamp, road conditions, such as calling codes 15, 16, and 17, from where an emergency call data was received. Location may be determined using reverse geocoding from where emergency call data was received. Crash reports from the NHTSA may be used for timestamp, location data, road conditions. In addition, specific driver behavior data for the current vehicle operator may be used as well as data from the location city or count indicating active construction zones and flood zones. In addition, data from insurance companies on areas where there is a high population of under insured and uninsured motorists may be used. In determining a high-risk area, the exemplary system may alter the driver and provide a proceed with caution indicator near a high-risk area based on current operator driving behavior and general driving behavior of drivers in that area. The system may color code the route on a navigation display indicative of the high-risk areas.

Figure 2:
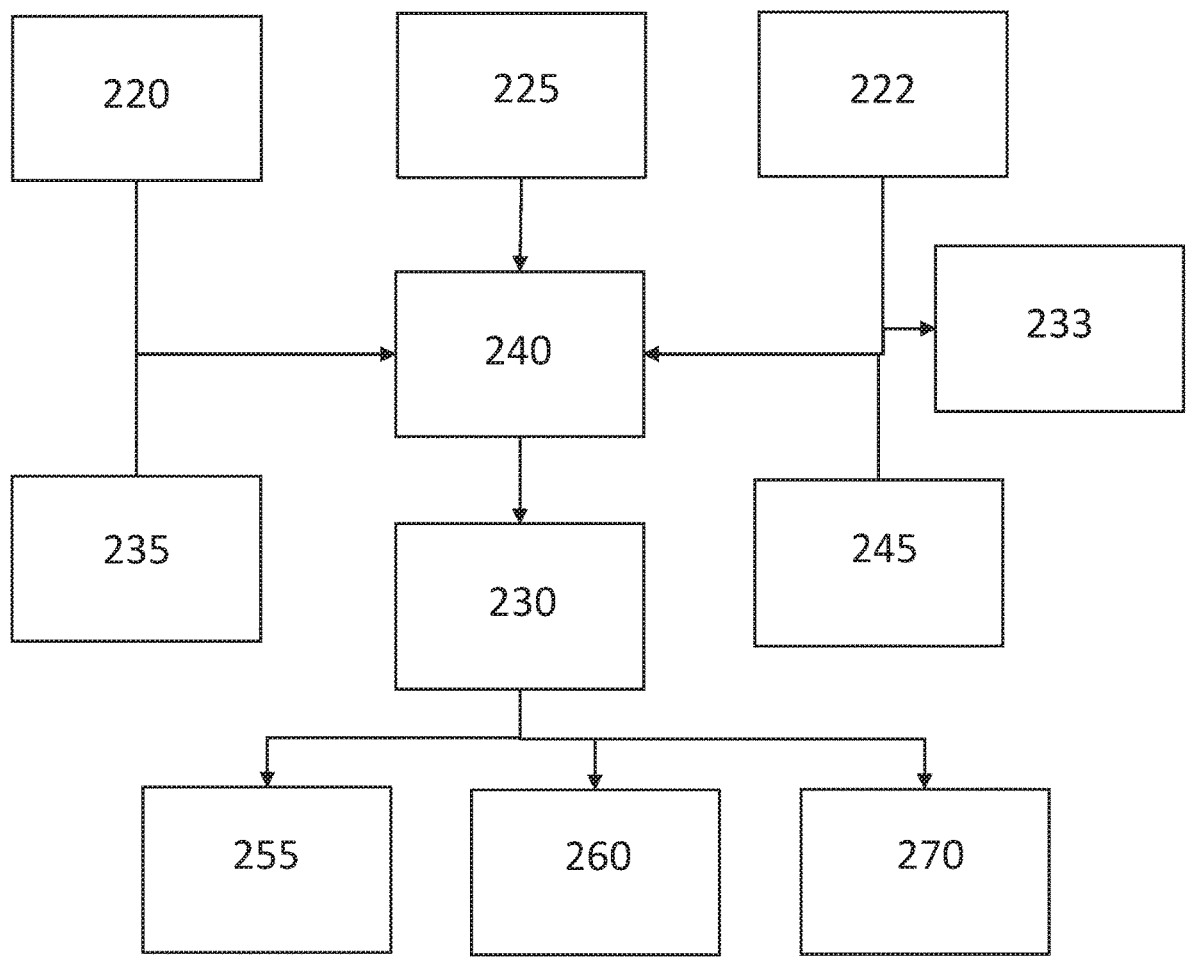
FIG. 2 shows a block diagram illustrating a system for providing alert notifications of high-risk driving areas in a connected vehicle according to an exemplary embodiment.

Turning now to FIG. 2, a block diagram illustrating an exemplary implementation of a system 200 for providing alert notifications of high-risk driving areas in a connected vehicle is shown. The system 200 may include a processor 240, a camera 220, a Lidar 222, a global positioning system (GPS) 225, a transceiver 233, a user interface 235, a memory 245, a vehicle controller 230 a throttle controller 255, a brake controller 260 and a steering controller 270.

During ADAS operation, the system 200 is operative to use various sensors such as a camera 220, IMU 233 and Lidar 222 capable of identifying and locating roadway markers, proximate vehicles and other external objects. Sensor fusion algorithms provides accurate tracking of external objects as well as calculation of appropriate attributes such as relative velocities, accelerations, and the like. The camera 220 is operative to capture an image of a field of view (FOV) which may include static and dynamic objects proximate to the vehicle. Image processing techniques may be used to identify and locate objects within the FOV. The identification and location of these objects and the surrounding environment may facilitate the creation of a three dimensional object map by the ADAS in order to control the vehicle in the changing environment.

The Lidar 222 is operative to generate a laser beam, transmit the laser beam into the FOV and capture energy reflected from a target. The Lidar 222 may employ time-of-flight to determine the distance of objects from which the pulsed laser beams are reflected. The oscillating light signal is reflected from the object and is detected by the detector within the Lidar 222 with a phase shift that depends on the distance that the object is from the sensor. An electronic phase lock loop (PLL) may be used to extract the phase shift from the signal and that phase shift is translated to a distance by known techniques.

The Lidar 222 may be employed as a sensor on the host vehicle to detect objects around the vehicle and provide a range to and orientation of those objects using reflections from the objects providing multiple scan points that combine as a point cluster range map, where a separate scan point is provided for every ½° or less across the field-of-view (FOV) of the sensor. Therefore, if a target vehicle or other object is detected in front of the subject vehicle, there may be multiple scan points that are returned that identify the distance of the target vehicle from the subject vehicle. By providing a cluster of scan return points, objects having various and arbitrary shapes, such as trucks, trailers, bicycle, pedestrian, guard rail, etc., can be more readily detected, where the bigger and/or closer the object to the subject vehicle the more scan points are provided.

The user interface 235 may be a user input device, such as a display screen, light emitting diode, audible alarm or haptic seat located in the vehicle cabin and accessible to the driver. Alternatively, the user interface 235 may be a program running on an electronic device, such as a mobile phone, and in communication with the vehicle, such as via a wireless network. The user interface 235 is operative to collect instructions from a vehicle operator such as initiation and selection of an ADAS function, desired following distance for adaptive cruise operations, selection of vehicle motion profiles for assisted driving, etc. In response to a selection by the vehicle operator, the user interface 235 may be operative to couple a control signal or the like to the processor 240 for activation of the ADAS function. The user interface may be operative to receive a user input regarding desired destination for generating a navigational route. The user interface maybe be operative to display the navigational route, upcoming portions of the navigational route, and upcoming turns and other vehicle maneuvers for the navigational route. Further, the user interface may be operative to provide a user prompt or warning indicative of an upcoming high-risk area, rerouting of a navigational route, presentation of an alternative route avoiding the high-risk area, and/or potential disengagement event of the ADAS and/or a request for the user to take over control of the vehicle.

The transceiver 233 is operative to transmit and receive data via a wireless network to a server, such as a central server or a cloud server. The transceiver may be further operative to receive data from the server indicative of locations of disengagement events, other ADAS operating state transitions, and/or other crowdsourced data, such as weather, road conditions, obstacles, obstructions, construction sites, traffic and the like which may be used to predict an ADAS state transition, such as a disengagement event. The transceiver 233 may be operative to receive NHTSA data, AACN event history, indicators of a high density of uninsured motorists, local driver behavior trends, road conditions, pedestrian culture, driver behavior, etc. The transceiver 233 may further receive current weather conditions, visibility, road closures or conditions, sun position, etc. Alternatively, the transceiver 233 may be operative to receive an indication of a high-risk area on a current navigational route or proximate to a vehicle position. This indication may be generated by an algorithm on a remote server or other service provided in response to the previously described factors. In an exemplary embodiment, the transceiver 233 may be a separate transmitter and receiver.

In an exemplary embodiment, the processor 240 is operative to receive the data from the transceiver 233 and to perform a high-risk area prediction algorithm. The processor 240 is operative to generate a first navigation route in response to a user input of a destination and a current location data received from the GPS 225. The processor may next be operative to couple the current location and/or the first navigation route to the transceiver 233 for transmission to a remote data server or the like. In response, the transceiver 233 is operative to receive data indicative of high-risk conditions in response to the first navigational route and/or proximate to the current location of the vehicle. The proximate risk data may include NHTSA crash data, ADAS disengagement data, vehicle to vehicle contract incident data, AACN event history, pedestrian behavior alert data, road conditions, public transit data, local events, etc. Alternatively, the received data may be a graded indication of risk in the proximate area and/or along the current navigational route. For example, the receive data may indicate that an upcoming route segment currently has a risk grade of 8 out of 10. The method may then be operative to compare this risk grade to a driver acceptable risk grade or to other risk grades along alternate routes.

In response to the received data, the processor 240 is next operative to compare the current route to the high-risk data to determine if the current route has an area of high-risk. If a high-risk area is determined, the processor 240 may be operative to calculate an alternate route to avoid the high-risk area. Alternatively, the processor 240 may be operative to generate a user alert to couple to the user interface 235 for display to the user. The user alert may be indicative of the upcoming high-risk area, a prompt indicating the high-risk area and presenting an alternate route option to the driver, or warning of a probable disengagement event of an ADAS.

In exemplary embodiment where the vehicle is an ADAS equipped vehicle, the vehicle controller 230 may generate control signals for coupling to other vehicle system controllers, such as a throttle controller 255, a brake controller 260 and a steering controller 270 in order to control the operation of the vehicle in response to the ADAS algorithm. The vehicle controller may be operative to adjust the speed of the vehicle by reducing the throttle via the throttle controller 255 or to apply the friction brakes via the brake controller 260 in response to a control signals generated by the processor 240. The vehicle controller may be operative to adjust the direction of the vehicle controlling the vehicle steering via the steering controller 270 in response to a control signals generated by the processor 240.

Figure 3:
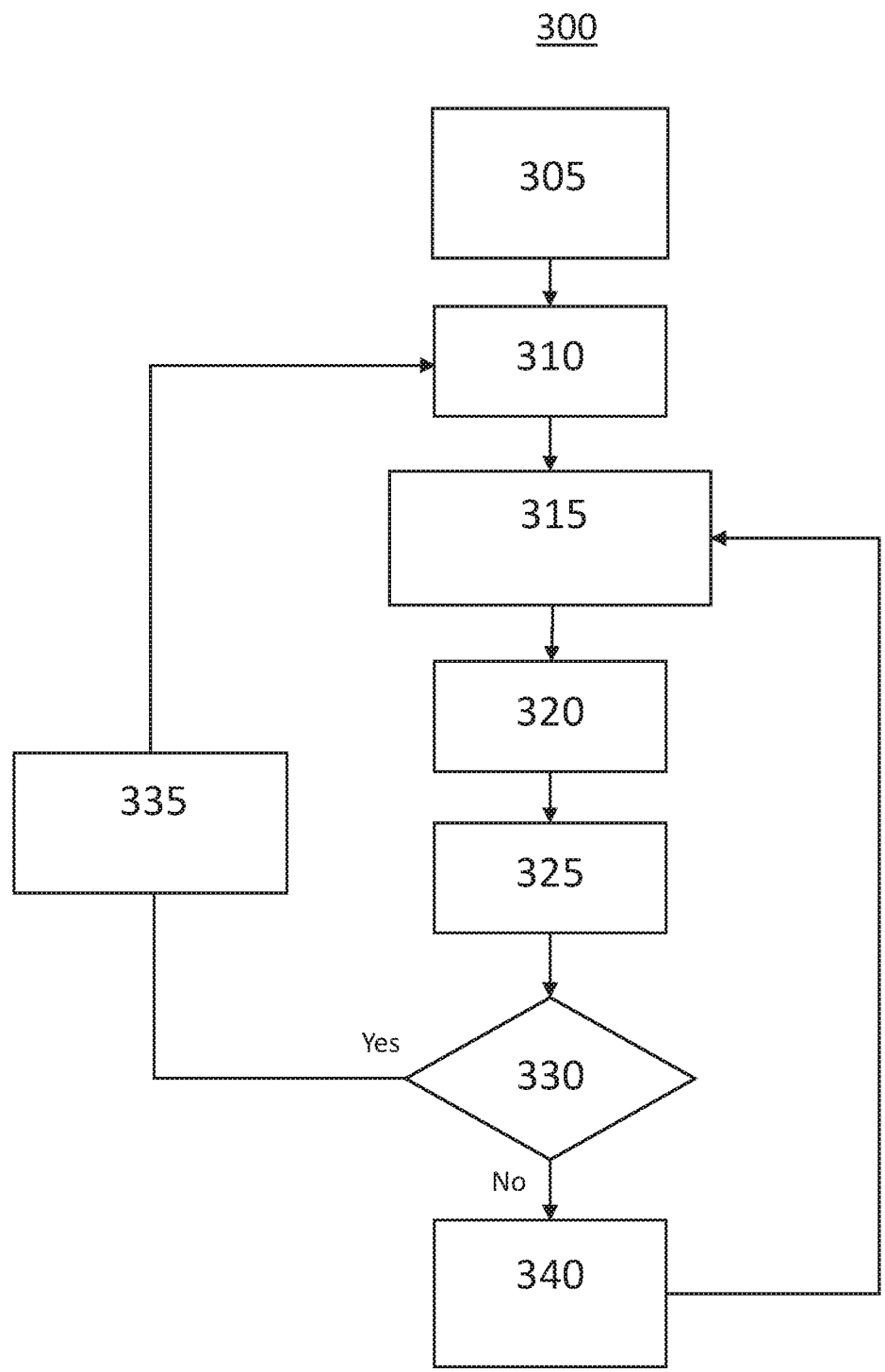
FIG. 3 shows a flow chart illustrating a method providing alert notifications of high-risk driving areas in a connected vehicle according to another exemplary embodiment.

Turning now to FIG. 3, a flow chart illustrating an exemplary implementation of a method 300 for providing alert notifications of high-risk driving areas in a connected vehicle is shown. The method is first operative to receive 305 a route request via a user interface or via a wireless transmission. The route request may be indicative of a destination or may be indicative of a destination with a preferred route. The route request may further be an initiation of an ADAS function, such as adaptive cruise control, in response to a user request via a user interface.

The method is next operative to calculate 310 a first navigational route between a current vehicle location and the destination input by the user and stored map data in a vehicle memory as well as previously received data received by via a wireless transmission. The map data and the received data may be indicative of roadways, traffic data, weather, construction information, and the like.

The method is next operative to determine 315 a current location of the vehicle. The method may determine this location in response to a GPS receive output and/or high definition map data or the like. The method is then operative to transmit 320 this current location to a server via a wireless network. The method may also transmit the current navigational route to the server as well as additional data such as ADAS status, driver profile, etc. The method is may then be operative to receive 325 proximate risk data from the server. The proximate risk data may include NHTSA crash data, ADAS disengagement data, vehicle to vehicle contract incident data, AACN event history, pedestrian behavior alert data, road conditions, public transit data, local events, etc. Alternatively, the received data may be a graded indication of risk in the proximate area and/or along the current navigational route. For example, the receive data may indicate that an upcoming route segment currently has a risk grade of 8 out of 10. The method may then be operative to compare this risk grade to a driver acceptable risk grade or to other risk grades along alternate routes.

In response to the received data, the method in next operative to determine 330 if the current route has an area of high-risk. If no high-risk area is determined in the upcoming route, the method is operative to maintain 240 the current route. If a high-risk area is detected, the method is operative to generate 335 an indicator of the location of the high-risk area and to calculate 310 an alternate route to avoid the high-risk area.

Figure 4:
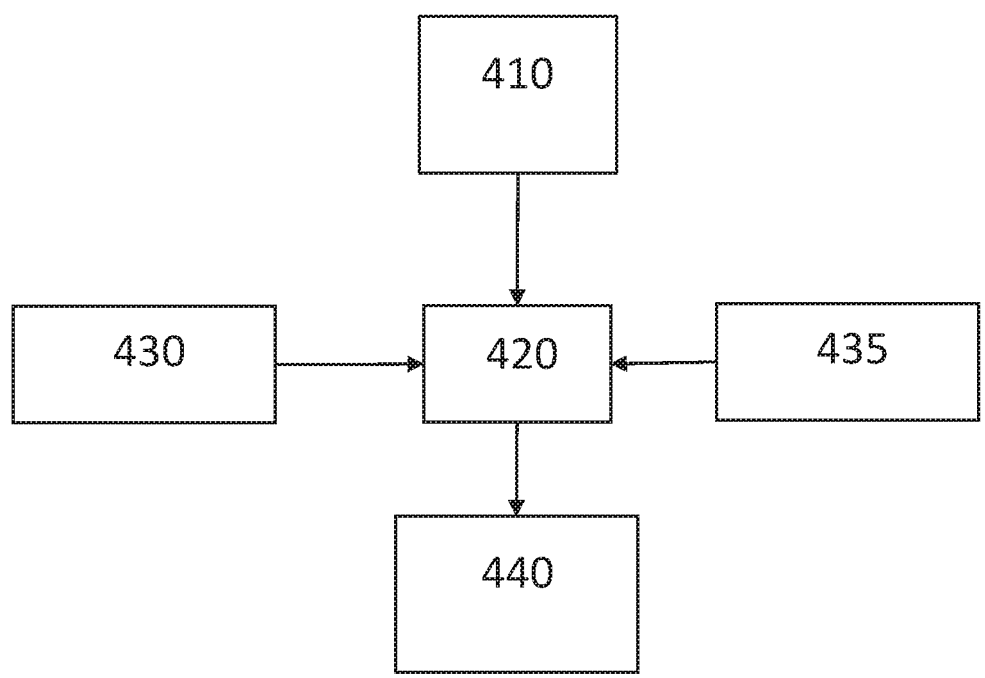
FIG. 4 shows a block diagram illustrating a system for providing alert notifications of high-risk driving areas in a connected vehicle according to another exemplary embodiment.

Turning now to FIG. 4, a block diagram illustrating another exemplary implementation of a system 400 for providing alert notifications of high-risk driving areas in a connected vehicle is shown. The system may be an advanced driver assistance system for controlling a host vehicle having a receiver 410, a processor 420, a user interface 430, and a vehicle controller 440.

In this exemplary embodiment, the receiver 410 is operative to receive a data indicative of a high-risk area. The data indicative of the high-risk area includes data indicative of vehicle to vehicle incidents and/or data indicative of an advanced driving assistance system disengagement event. This data may be generated in response to government highway safety records, insurance records, crowdsourced data or the like. The data may be received in response to a transmission of a navigational route and/or a current vehicle location via a wireless network and wherein the data indicative of the high-risk area is received in response to the navigational route.

The exemplary system further includes a processor 420 operative generate a navigational route in response to a user generated destination received via a user interface 430 and a map data stored on a memory 435. The processor 420 is further operative to compare the navigational route to the data indicative of the high-risk area and to generate an alternative navigational route in response to the navigational route including the high-risk area. The processor 420 is further operative to generate a control signal to couple to the vehicle controller 440 for controlling the vehicle in response to the navigational route and the alternative navigational route.

The user interface 430 is operative to display the alternative navigational route to a vehicle driver in response to data indicative of the alternative navigational route being coupled to the user interface 430 from the processor 410. The user interface 430 may be operative to present an indicator of the high-risk area and an option to the vehicle driver to select the alternative navigational route or the navigational route. Alternatively, the processor 420 may be further operative to predict an advanced driving assistance system disengagement event in response to the data indicative of the high-risk area, to generate a user alert in response to the prediction and to couple the user alert to the user interface 430, the user interface 430 being further operative to display the user alert.

The memory 435 may be operative to store previously received indications of high-risk areas, an evaluation of the driver performance characteristics, algorithms for determining sun location and elevation, weather data, previous host vehicle incidents, such as ADAS disengagement, locations of hard braking incidents, and other adverse road conditions.

Figure 5:
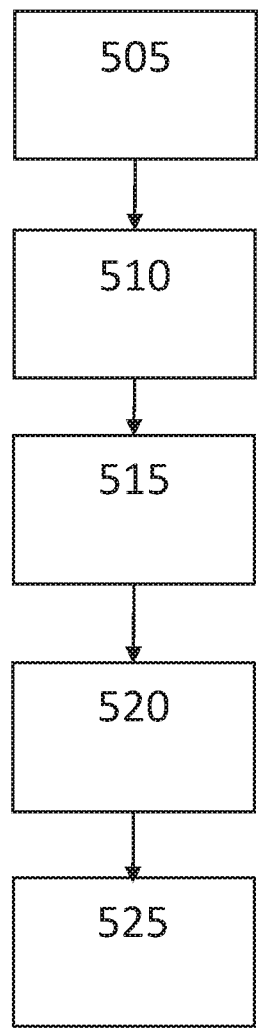
FIG. 5 shows a flow chart illustrating a method for providing alert notifications in a connected vehicle according to another exemplary embodiment.

Turning now to FIG. 5, a flow chart illustrating an exemplary implementation of a system 500 for providing alert notifications of high-risk driving areas in a connected vehicle is shown. The exemplary method 500 is first operative to calculate 505 a first navigational route between a host vehicle location and a destination. The method next operative to transmit 510 the first navigational route via a wireless network. In response to the transmission of the first navigational route, the method may then be operative to receive 515, via the wireless network, an indication of a high-risk area in response to the first navigational route. The method is next operative to generate 520 a second navigational route in response to the high-risk area. Finally, the method is operative to present 525 the second navigational route to a vehicle occupant via a user interface.

In an exemplary embodiment, the method is performed by a processor in an ADAS equipped vehicle and the processor is further operative to control the vehicle along the second navigational route. The processor may be further operative to predict an advanced driving assistance system disengagement event in response to the indication of the high-risk area and generate a driver warning in response to the prediction. The driver warning may be displayed on a user interface or may be an audible alarm played within the vehicle cabin of the ADAS equipped vehicle.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An apparatus comprising:
   a receiver operative to receive a data indicative of a high-risk area;
   a vehicle controller for autonomously controlling a vehicle in response to an advanced driving assistance system algorithm along a first navigational route in response to a first navigational route data and a second navigational route in response to a second navigational route data; and
   a processor operative generate the first navigational route data, to couple the first navigational route data to the vehicle controller to initiate control the vehicle along the first navigational route, to transmit the first navigational route data to a server via a wireless network, to receive the data indicative of the high risk area from the receiver in response to a transmission of the first navigational route to the server, to compare the first navigational route data to the data indicative of the high-risk area during control of the vehicle along the first navigational route, to predict an advanced driving assistance system disengagement event in response to the data indicative of the high-risk area and the first navigational route data wherein the disengagement event requires at least one of a driver intervention and a resumption of driver control of the vehicle from the vehicle controller, to generate the second navigational route data to avoid the disengagement event in response to the first navigational route including the high-risk area and a prediction of the advanced driving assistance system disengagement event wherein the second navigational route does not include the high-risk area, and coupling the second navigational route data to the vehicle controller to initiate control the vehicle along the second navigational route.

2. The apparatus of claim 1 wherein the data indicative of the high-risk area includes data indicative of vehicle to vehicle incidents.

3. The apparatus of claim 1 wherein the data indicative of the high-risk area includes a data indicative of the advanced driving assistance system disengagement event.

4. The apparatus of claim 1 including a transmitter for transmitting the first navigational route via a wireless network and wherein the data indicative of the high-risk area is received in response to the first navigational route.

5. The apparatus of claim 1 including a memory for storing a map data and wherein the first navigational route and the second navigational route are generated in response to the map data.

6. The apparatus of claim 1 wherein a user interface is operative to present an indicator of the high-risk area and an option to the vehicle driver to select the second navigational route or the first navigational route.

7. The apparatus of claim 1 wherein the processor is further operative to generate a user alert in response to the prediction and to couple the user alert to a user interface, the user interface being further operative to display the user alert.

8. A method performed by a processor comprising:
   calculating a first navigational route between a host vehicle location and a destination;
   controlling a host vehicle along the first navigational route in response to the first navigational route and an assisted driving algorithm;
   transmitting the first navigational route via a wireless network in response to controlling the host vehicle along the first navigational route;
   receiving via a wireless network an indication of a high-risk area in response to the first navigational route;
   predicting an advanced driving assistance system disengagement event in response to the indication of the high-risk area on the first navigational route wherein the advanced driving assistance system disengagement event would require at least one of a driver intervention and a resumption of driver control of the vehicle from the vehicle controller;
   generating a second navigational route to avoid the disengagement event in response to the prediction of the advanced driving assistance system disengagement event; and
   controlling the host vehicle along the second navigational route.

9. The method of claim 8 wherein the indication of the high-risk area includes data indicative of a vehicle to vehicle incident.

10. The method of claim 8 wherein the indication of the high-risk area includes data indicative of the advanced driving assistance system disengagement event.

11. The method of claim 8 including generating a driver warning in response to the prediction of the advanced driving assistance system disengagement event.

12. The method of claim 8 wherein the indication of the high-risk area is generated in response to pedestrian behavior within the high-risk area.

13. The method of claim 8 wherein the indication of the high-risk area is generated in response to a current event within the high-risk area.

14. The method of claim 8 wherein the indication of the high-risk area is a geographical region determined by a remote service provider in response to crowdsourced data.

15. The method of claim 8 wherein the indication of the high-risk area is a geographical region determined by a remote service provider in response to publicly available highway safety data.

16. The method of claim 8 wherein the second navigational route is generated in response to the high-risk area and a driver behavioral determination.

17. An advanced driver assistance system for controlling a host vehicle comprising:
- a global positioning system sensor for detecting the host vehicle location;
- a user interface for receiving a user input indicative of a destination and to display a navigational route and an alternative route;
- a memory operative to store a map data;
- a transmitter for transmitting the navigational route via a wireless network;
- a receiver for receiving a high-risk driving location in response to the navigational route; and
- a processor for generating the navigational route in response to the host vehicle location, the destination, and the map data, coupling the navigational route to the transmitter, receiving the high risk driving location from the receiver, for predicting an advanced driving assistance system disengagement event in response to the high-risk driving location and the navigational route wherein the advanced driving assistance system disengagement event would require at least one of a driver intervention and a resumption of driver control of the host vehicle, for generating the alternative route to avoid the disengagement event in response to the high-risk driving location being located along the navigational route and to couple a control signal indicative of the alternative route to a vehicle controller for controlling the host vehicle along the alternative route.

18. The advanced driver assistance system for controlling the host vehicle of claim 17 wherein the vehicle controller is configured for controlling the vehicle along the alternative route in response to a user selection of the alternative route via the user interface.

19. The advanced driver assistance system for controlling the host vehicle of claim 17 wherein the processor is further operative for generating a user warning in response to the prediction of the advanced driving assistance system disengagement event and for coupling the user warning to the user interface.

* * * * *